Feb. 3, 1970 W. A. HERTEL 3,493,250
COUPLING FOR THERMOPLASTIC TUBE
Filed Dec. 18, 1967

INVENTOR
WILLIAM A. HERTEL

United States Patent Office 3,493,250
Patented Feb. 3, 1970

3,493,250
COUPLING FOR THERMOPLASTIC TUBE
William A. Hertel, Mayfield Village, Ohio, assignor to Parker-Hannifin Corporation, Cleveland, Ohio, a corporation of Ohio
Filed Dec. 18, 1967, Ser. No. 691,436
Int. Cl. F16l *33/00, 31/00, 47/00, 49/00*
U.S. Cl. 285—249              11 Claims

ABSTRACT OF THE DISCLOSURE

A coupling for thermoplastic tube in which the coupling body has a bore in which a metal insert is mounted, the insert having a first tubular extension receivable within the tube and a second tubular extension of larger diameter that is press fitted into the body bore, the coupling also including a plastic sleeve that is deformable into holding engagement with the tube and the tube in turn is plastically deformed to provide a holding shoulder for the sleeve.

---

Couplings for thermoplastic tubing generally include a metallic insert receivable in the end of the tube to support the same against radial collapse when gripping pressure is applied to the outer surface of the tube. Such inserts heretofore have been loose pieces that are difficult to handle.

The present invention provides an insert that is attached to the coupling body so that the two members may be handled as one, and further provides a design for the insert and a method of attaching the same that assures a secure connection to the body in a properly aligned position and is yet economical to manufacture and assemble. This is accomplished by providing the insert with a first tubular extension receivable within the tube to support the same and a second tubular extension of larger diameter than the first which is press fitted into the body bore and against a transverse shoulder in the body. The tubular press fit portion and the endwise engagement with the transverse shoulder provide a rigid support for maintaining the insert in a set aligned position.

The invention further provides a thermoplastic gripping sleeve and cooperating contact surfaces on the nut and body that plasticly deform the sleeve against the tube and causes the latter to be plasticly deformed to provide a holding shoulder for the tube.

With prior couplings in which a plastic sleeve has been used in conjunction with plastic tubing it is difficult to obtain a secure grip upon the tube to prevent pullout of the tube from the coupling. Also, the tube and sleeve are subject to cold flow that results in fluid leakage and greater susceptibility to pullout. Because of such deficiencies such prior couplings have not been suitable for critical installations, as for example in automotive brake lines.

The present invention solves this problem by providing a plasticly deformable sleeve that is harder and has greater cold flow resistance than the plastic tube and by forming the parts so that the sleeve and tube are mutually plasticly deformed to achieve a secure grip upon the tube.

Figure 1:
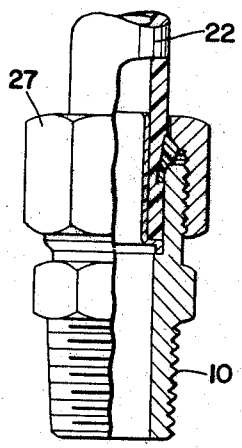
FIGURE 1 is a partial longitudinal sectional view of the coupling in final assembled position upon the tube.

The coupling comprises a body 10 having a bore 11 and another bore 12 that ends at transverse shoulder 13 and which has an outwardly flaring cam surface 14 at its outer end. Cam surface 14 in cross section outline is formed on a radius that is tangent with bore 12 and the outer end face 15 of the body.

Mounted within bore 12 is a metal insert 18 having a first tubular extension 19 of a diameter to snugly fit the inside diameter of a thermoplastic tube 22 and also having a second tubular portion 23 joined to the first tubular portion 19 by a transverse flange 24. Thermoplastic tube 22 is preferably of nylon (a registered trade name of Du Pont) or similar material with a hardness of up to about Rockwell R–118 and a cold flow deformation at 2,000 p.s.i. load at 120° F. of about 1.4%, and which has an initial radial clearance with bore 12 of about .005″.

A thermoplastic sleeve 26 encircles the tube and is plastically deformed into gripping engagement therewith by compression of the sleeve between cam surface 14 and a nut 27 threadedly connected to the body at 28. Sleeve 26 is preferably of Delrin (a Du Pont trade name) or similar plastic that is harder than the tube, the hardness preferably being about Rockwell R–120 and the cold flow percentage being about .5. The sleeve has a front face 34 of about .030″ or no less than about four times the radial clearance between the tube and body bore 12.

Figure 4:
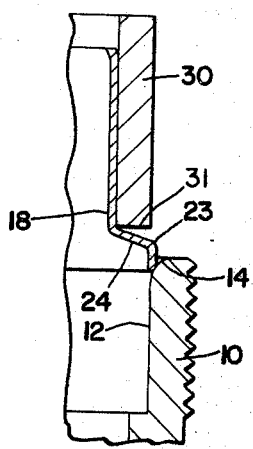
FIGURE 4 is a fragmentary section view of the body and insert just prior to press fitting together of the parts.

Insert 18 is preferably made as a stamping for economical manufacture. As illustrated in FIGURE 4, its flange 24 is initially slightly conical in shape and the second tubular portion 23 is slightly larger in diameter than body bore 12. The insert may be pressed into the body bore by a suitable tool arrangement that includes an annular ring 30 whose forward face 31 is normal to the longitudinal axis of the sleeve and hence divergent relative to flange 24 so as to initially contact the latter at its radially inner margin.

Figure 3:
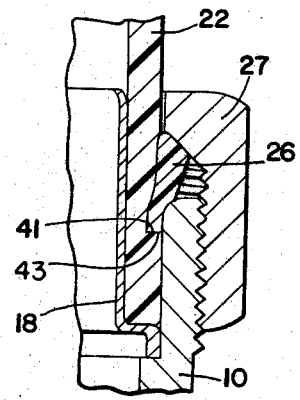
FIGURE 3 is an enlarged fragmentary sectional view showing the parts in final assembled position.
Figure 5:
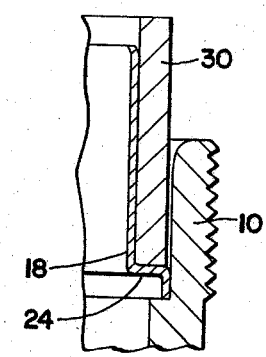
FIGURE 5 is a fragmentary section view showing the insert press fitted into the body to the point where it engages the transverse shoulder in the body.
Figure 6:
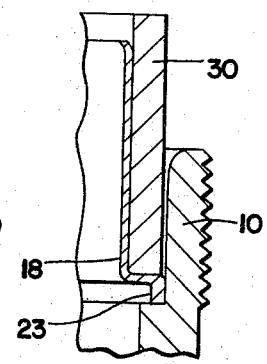
FIGURE 6 is a fragmentary section view showing the insert in its final pressed-in position in the body.

As sleeve 18 is pressed into bore 12, flange 24 is deformed so as to be in the same plane as face 31 of the tool, as shown in FIGURE 5. After the forward end of second tubular portion 23 has contacted transverse body shoulder 13, pressure is continued to be applied by tool 30 with the result that tubular portion 23 is compressed endwise and radially thickened, as shown in FIGURES 3 and 6. This, plus the radial force applied to the second tubular portion 23 by straightening of the conical flange 24, create a very high pressure between the second tubular portion and bore 12 to securely lock and seal the insert to the body. Hence the insert is very rigidly secured and located relative to the body.

Figure 2:
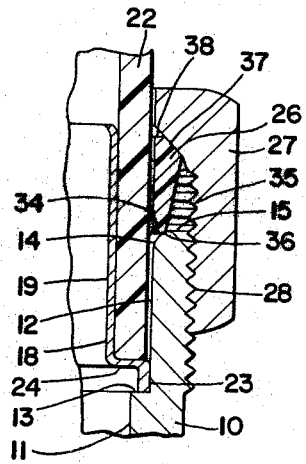
FIGURE 2 is an enlarged fragmentary sectional view showing the parts in loosely assembled position.

As shown in FIGURE 2, sleeve 26 has a straight across forward face 34 that intersects an outer conical surface 35 at a corner 36. The latter initially engages cam surface 14 on a circular line contact at a location which in cross section is spaced radially inward from the center point of curvature of the cam surface a distance equal to between ½₂ and ¼ the radius of such curvature. The angle of inclination of cam surface 14 at this location is sufficiently steep to provide enough resistance to cause the desired deformation of sleeve 26 and yet permit the sleeve to ride down the cam surface and be radially contracted thereby against the tube. Furthermore, best results are obtained when the included angle of inclined surface 35 is substantially 22°.

The rear end of sleeve 26 has a transverse face 38 intersecting with a face 37 that is inclined at a 45° angle. Face 37 is engaged by a corresponding tapered face on the nut to provide a large bearing area and yet induce radially inward deformation of the sleeve.

With the sleeve and the contacting parts of the body and nut formed as just decribed, tightening of the nut will cause the sleeve to become plasticly deformed against and into the tube and in turn causes the latter to be plasticly deformed as shown in FIGURE 3. In the deformed condition of the sleeve and tube, the forward portion 41 of the sleeve retains substantial thickness and becomes embedded in the plastic tube. The latter is deformed to form a holding shoulder 43 for the sleeve that is substantially at right angles to the longitudinal axis of the coupling.

In such tightened condition, the forward edge 34 of the sleeve enters the cylindrical portion of the bore 12 and is in firm contact therewith. Meanwhile, substantially the whole portion of the tube that is forward of the sleeve has plasticly deformed radially inwardly and outwardly so as to be in tight contact with insert 18 and bore 12 throughout the entire distance between sleeve 26 and flange 24 so that there is no remaining clearance into which this portion of the tube may travel by cold flow after the coupling has been tightened. Moreover, in the final position the forward end of the sleeve is within bore 12 inwardly of cam surface 14 so that expansion of the forward end of the tube by plastic deformation is confined to that portion in bore 12 inwardly of cam surface 14. Plastic deformation of the tube is achieved without causing appreciable radial deformation of the insert 18 which would otherwise restrict the flow passage therethrough.

If desired, bore 12 may be tapered a few degrees with its larger diameter adjacent cam surface 14 to facilitate removal of the tube upon disassembly of the nut from the body, but it has been found that there is sufficient relaxation of the tight fit of the tube in bore 12 upon disassembly of the nut so that bore 12 may be truly cylindrical.

The sleeve toward its center and rear section is sufficiently thick so that it is deformed and engaged by the radially outermost portion cam surface 14 to provide high resistance to further tightening of the nut and thus indicate that sufficient tightening has been accomplished and avoiding excessive deformation of the tube to the extent that the latter would be thinned to less than one half its original wall thickness under the sleeve. In addition, the rear portion of sleeve 26 deforms radially inwardly to become embedded within tube 22 but to a lesser degree than the forward end of the sleeve.

I claim:

1. A tube coupling comprising a body having a substantially cylindrical bore ending in a transverse shoulder with an outwardly flaring cam surface at its outer end, an insert mounted in said bore and having a first tubular portion spaced radially inwardly of said bore to provide an annular space therebetween, a second tubular portion engaging said shoulder, said second tubular portion being securely locked in said bore, and a transverse flange joining said first and second tubular portions, said transverse flange initially being slightly conical prior to assembly of said insert into said bore, said transverse flange being flattened by application of pressure during assembly of said insert into said bore which applies a radial outward force to said second tubular portion for enhancing the lock between said second tubular portion and said bore, a part of said first tubular portion projecting from said bore, a tube of plasticly deformable plastic material extending over said first tubular portion and into said annular space, a plasticly deformable sleeve of a plastic material that is harder than said tube encircling said tube radially opposite the projecting part of said first tubular portion and having its inner end adjacent said cam surface, said tube having a small initial radial clearance with said bore, and the forward end face of said sleeve being in a plane substantially perpendicular to the longitudinal axis of said sleeve and of a radial width of no less than four times said radial clearance, and means interengaged with said body and movable into engagement with the outer end of said sleeve to force said sleeve against said cam surface and cause said sleeve to be plasticly deformed by said cam surface against said tube and said tube to be plasticly deformed forwardly of the sleeve so that the sleeve becomes embedded in said tube and said tube forwardly of said sleeve engages said bore and insert to fill up said initial radial clearance between said tube and said bore and insert, such deformation of said tube producing a transverse holding shoulder therein engaged by the inner end of said sleeve.

2. The coupling of claim 1 in which said cam surface in longitudinal cross-section is arcuate and tangent to said bore, and said sleeve has a circular corner that makes initial contact with said cam surface at a location a distance radially inwardly of the center point of said arcuate cam surface of between 1/12 and 1/4 the radius of said arcuate cam surface.

3. The coupling of claim 2 in which said sleeve has a forward transverse surface and a rearwardly extending tapered outer surface that intersect at said corner, said tapered outer surface having an angle between 20 and 24 degrees with respect to the longitudinal axis of said sleeve.

4. A tube coupling comprising a body having a bore ending in a transverse shoulder and an outwardly flaring cam surface at the outer end of said bore, an insert mounted in said bore and having a first tubular portion spaced radially inwardly of said bore to provide an annular space therebetween, a part of said first tubular portion projecting from said bore, said insert having at its inner end a second tubular portion with an initial diameter slightly greater than said bore and which permits said second tubular portion to be press fitted into said bore for locking said second tubular portion in said bore. a transverse flange joining said first and second tubular portions, said transverse flange initially being slightly conical prior to assembly of said insert into said bore, said transverse flange being flattened by application of pressure during assembly of said insert into said bore which applies a radial outward force to said second tubular portion for enhancing the lock between said second tubular portion and said bore, a tube extending over said first tubular portion and into said annular space, a sleeve of deformable material encircling said tube radially opposite the projecting part of said first tubular portion and having its inner end adjacent said cam surface, and means interengaged with said body and movable along said tube into engagement with said sleeve to force said sleeve against said cam surface thus to cause said sleeve to be deformed by said cam surface into gripping engagement with said tube.

5. The coupling of claim 4 in which said cam surface in longitudinal cross-section is arcuate and tangent to said bore, and said sleeve has a circular corner that makes initial contact with said cam surface at a location a distance radially inwardly of the center point of said arcuate cam surface of between 1/12 and 1/4 the radius of said arcuate cam surface.

6. The coupling of claim 5 in which said sleeve has a forward transverse surface and a rearwardly extending tapered outer surface that intersect at said corner, said tapered outer surface having an angle betwen 20 and 24 degrees with respect to the longitudinal axis of said sleeve.

7. A tube coupling element comprising a body having a bore ending in a transverse shoulder and an outwardly flaring cam surface at the outer end of said bore, an insert mounted in said bore and having a first tubular portion spaced radially inwardly of said bore to provide an annular space therebetween, a part of said first tubular portion projecting from said bore, said insert having at its inner end a second tubular portion with an initial diameter slightly greater than said bore which permits second tubular portion to be press fitted into said bore to lock said second tubular portion in said bore, a transverse flange joining said first and second tubular portions, said transverse flange initially being slightly conical prior to assembly of said insert into said bore, said transverse flange being flattened by application of pressure during assembly of said insert into said bore which applies a radial outward force to said second tubular portion for enhancing the lock between said second tubular portion and said bore.

8. The coupling element of claim 7 wherein said second tubular portion has an initial radial thickness which permits said second tubular portion to be radially thickened by pressure engagement with said transverse shoulder during assembly of said insert into said bore to further enhance the lock between said second tubular portion and said bore.

9. The method of making a tube coupling element including a body containing a bore terminating at its inner end in a transverse shoulder and at its outer end in an outwardly flaring cam surface, and an insert having a first tubular portion at one end with a diameter smaller than the diameter of said bore and a second tubular portion at the other end having a diameter slightly larger than such bore diameter, such first and second tubular portions being connected to each other by a transverse flange having a slightly conical shape, comprising the steps of pressing such second tubular portion into such bore until the free end of such second tubular portion engages such transverse shoulder, and applying a force to such transverse flange while pressing such second tubular portion into such bore thus to flatten such transverse flange which applies a radial outward force tending to increase the diameter of such second tubular portion for securely locking such second tubular portion into such bore.

10. The method of claim 9 further comprising the step of continuing the pressing operation until such second tubular portion has been compressed lengthwise with a resulting radial thickening of the wall thickness of such second tubular portion thus to further securely lock such second tubular portion in such bore.

11. The method of claim 9 in which such transverse shoulder is in a plane substantially normal to the longitudinal axis of such insert and such conical flange is deformed to lie in such plane.

References Cited

UNITED STATES PATENTS

| | | | |
|---|---|---|---|
| 2,152,537 | 3/1939 | Couty | 285—249 |
| 2,252,920 | 8/1941 | Edelmann | 285—249 X |
| 2,300,464 | 11/1942 | Parker | 285—248 X |
| 2,328,298 | 8/1943 | Santhoff | 285—249 X |
| 2,365,747 | 12/1944 | Cowles | 285—249 |
| 2,821,567 | 1/1958 | Bergan | 285—249 X |
| 3,008,736 | 11/1961 | Samiran | 285—249 X |
| 3,332,708 | 7/1967 | Jackson et al. | 285—249 X |

FOREIGN PATENTS 1,092,737  11/1960  Germany.

THOMAS F. CALLAGHAN, Primary Examiner

U.S. Cl. X.R.

29—522, 525; 285—382.7